United States Patent
Sheynblat et al.

(10) Patent No.: US 6,433,731 B1
(45) Date of Patent: Aug. 13, 2002

(54) METHOD AND APPARATUS FOR DETERMINING TIME IN A SATELLITE POSITIONING SYSTEM

(75) Inventors: Leonid Sheynblat, Belmont; Norman F. Krasner, San Carlos, both of CA (US)

(73) Assignee: SnapTrack, Inc., Campbell, CA (US)

( * ) Notice: Subject to any disclaimer, the term of this patent is extended or adjusted under 35 U.S.C. 154(b) by 0 days.

(21) Appl. No.: 09/684,345

(22) Filed: Oct. 6, 2000

Related U.S. Application Data

(60) Division of application No. 09/062,232, filed on Apr. 16, 1998, now Pat. No. 6,215,442, which is a continuation-in-part of application No. 08/794,649, filed on Feb. 3, 1997, now Pat. No. 5,812,087.

(51) Int. Cl.[7] .............................................. H04B 7/185
(52) U.S. Cl. .............................. 342/357.06; 342/357.13
(58) Field of Search ........................... 342/352, 357.06, 342/357.12, 357.13, 104; 701/213, 215

(56) References Cited

U.S. PATENT DOCUMENTS

| | | | |
|---|---|---|---|
| 4,445,118 A | 4/1984 | Taylor et al. ................ | 342/357 |
| 4,449,830 A | 5/1984 | Bulgier ........................ | 368/119 |
| 4,578,678 A | 3/1986 | Hurd ........................... | 343/357 |
| 4,734,701 A | 3/1988 | Grobert ....................... | 342/380 |
| 5,117,232 A | 5/1992 | Cantwell ..................... | 342/357 |
| 5,225,842 A | 7/1993 | Brown et al. ................ | 342/357 |
| 5,317,322 A | 5/1994 | Grobert ....................... | 342/378 |
| 5,317,323 A | 5/1994 | Kennedy et al. ............ | 342/457 |
| 5,319,374 A | 6/1994 | Desai et al. ................. | 342/387 |
| 5,347,285 A | 9/1994 | MacDoran et al. ......... | 342/357 |

(List continued on next page.)

FOREIGN PATENT DOCUMENTS

| | | | |
|---|---|---|---|
| EP | 0444738 | 9/1991 | |
| EP | 0508405 | 10/1992 | |
| EP | 0545636 | 6/1993 | |
| EP | 0679901 | 11/1995 | |
| GB | 2301725 | 12/1996 | |
| WO | WO 95/04941 | 2/1995 | ............. G01S/5/02 |
| WO | WO 99/31524 | 6/1999 | ............. G01S/5/14 |

OTHER PUBLICATIONS

Search Report for PCT/US 99/07974 mailed Apr. 14, 2000, 7 pages.
PCT International Search Report for Int'l appln No. PCT/US98/01476, mailed Jul. 8, 1998.

(List continued on next page.)

Primary Examiner—Dao Phan
(74) Attorney, Agent, or Firm—Blakely, Sokoloff, Taylor & Zafman LLP

(57) ABSTRACT

A method and apparatus for determining a reference time associated with a satellite positioning system. In turn, the reference time, in one embodiment, may be used to determine other navigational information. Such navigational information may include, for example, the location/position of a satellite positioning system (SPS) receiver. In one embodiment, a relative velocity between an SPS receiver and a set of one or more satellites is used to determine an offset between time as indicated by the SPS receiver and the reference time. According to another embodiment of the invention, an error statistic is used to determine the reference time. According to yet another embodiment of the invention, two records, each representing at least a portion of a satellite message, are compared to determine time. In one implementation, the SPS receiver is mobile and operates in conjunction with a basestation to determine time and/or other navigational information according to one or a combination of the methods described.

17 Claims, 12 Drawing Sheets

U.S. PATENT DOCUMENTS

| | | | |
|---|---|---|---|
| 5,379,224 A | | 1/1995 | Brown et al. ............... 364/449 |
| 5,412,388 A | * | 5/1995 | Attwood ..................... 342/357 |
| 5,420,592 A | | 5/1995 | Johnson ..................... 342/357 |
| 5,444,450 A | * | 8/1995 | Olds et al. .................. 342/457 |
| 5,451,964 A | | 9/1995 | Babu .......................... 342/357 |
| 5,461,390 A | * | 10/1995 | Hoshen ...................... 342/419 |
| 5,510,797 A | | 4/1996 | Abraham et al. ........... 342/352 |
| 5,515,062 A | * | 5/1996 | Maine et al. ................ 342/457 |
| 5,521,887 A | | 5/1996 | Loomis ........................ 368/47 |
| 5,570,097 A | | 10/1996 | Aguado ...................... 342/357 |
| 5,623,414 A | | 4/1997 | Misra ...................... 364/449.1 |
| 5,625,556 A | | 4/1997 | Janky et al. ........... 364/423.09 |
| 5,629,708 A | | 5/1997 | Rodal et al. ................ 342/357 |
| 5,640,442 A | | 6/1997 | Fitzgerald et al. ............ 379/57 |
| 5,663,734 A | | 9/1997 | Krasner ...................... 342/357 |
| 5,680,140 A | | 10/1997 | Loomis ...................... 342/357 |
| 5,731,786 A | * | 3/1998 | Abraham et al. ........... 342/357 |
| 5,831,576 A | * | 11/1998 | Sheynblat ................... 342/357 |
| 5,841,026 A | | 11/1998 | Kirk et al. ................ 73/178 R |
| 5,917,434 A | * | 6/1999 | Murphy ...................... 340/991 |
| 5,917,444 A | * | 6/1999 | Loomis et al. .............. 342/357 |
| 6,018,312 A | * | 1/2000 | Haworth ..................... 342/353 |
| 6,107,959 A | * | 8/2000 | Levanon ..................... 342/357 |
| 6,208,861 B1 | * | 3/2001 | Suzuki ........................ 455/441 |

OTHER PUBLICATIONS

F. H. Raab, G.W. Board, et al. "An Application of the Global Positioning System to Search and Rescue and Remote Tracking," *Navigation Journal of the Institute of Navigation*, 24:3, Fall 1997.

"Navstar GPS User Equipment Introduction," Public Release Version (Feb. 1991), pp. 12–10 to 12–21.

Sturza, Mark A. "GPS Navigation Using Three Satellites and a Precise Clock," Mar. 1993, pp. 122–132.

Copps, Edward M. "An Aspect of the Role of the Clock in a GPS Receiver," Jan. 1984, pp. 44–53.

PCT Invitation to Pay Additional Fees for Int'l Appln No. PCT/US99/07974 mailed Sep. 23, 1999.

* cited by examiner

METHOD AND APPARATUS FOR DETERMINING TIME IN A SATELLITE POSITIONING SYSTEM

CROSS REFERENCES TO RELATED APPLICATIONS

This application is a divisional application of U.S. patent application Ser. No. 09/062,232, filed Apr. 16, 1998, now U.S. Pat. No. 6,215,442.

The application is a continuation-in-part of U.S. patent application Ser. No. 08/794,649, entitled "Method and Apparatus for Satellite Positioning System Based Time Measurement", filed on Feb. 3, 1997, now U.S. Pat. No. 5,812,087 and assigned to the assignee of the present invention.

BACKGROUND OF THE INVENTION

1. Field of the Invention

This invention relates to satellite positioning systems (SPS), and in particular, to determining time associated with SPS signal transmission and/or reception.

2. Background Information

SPS receivers such as GPS (Global Positioning System) receivers normally determine their position by computing relative times of arrival of signals transmitted simultaneously from a multiplicity of satellites such as GPS (or NAVSTAR) satellites. In typical satellite positioning systems, such as GPS, the multiplicity of satellites are synchronized according to a highly accurate system clock, which may provide atomic clock accuracy. Generally, each satellite transmits navigational data (e.g., the location of the satellite) that also includes a time stamp to indicate when the data was transmitted, according to the time as indicated by the system clock (referred to hereafter as system time), which, in the case of GPS, is referred to as (GPS) system time.

However, SPS receivers typically do not have such an accurate clock. Thus, an SPS receiver typically determines timing information by reading and timing information contained in the satellite message. Many receivers determine position and time by using measurements from four (or more) satellites. The range to each of four satellites (i=1, 2, 3, 4) may be expressed as:

$$PR_i = \sqrt{(x-x_i)^2 + (y-y_i)^2 + (z-z_i)^2} + cb \quad (1)$$

wherein
- x, y, and z are the coordinates/position of the receiver (unknown);
- $x_i$, $y_i$, and $z_i$ are the ith satellite's coordinates/position (known); and
- cb represents the clock bias, which is a result of the error in time between the clock of the receiver and the reference time (unknown).

Thus, there is typically a total of four unknowns in equation (1) above.

Often, $PR_i$ is referred to as a pseudorange, since it represents the actual range to the ith satellite, plus or minus an offset that may result due to the receiver's clock error, as indicated by the cb term in equation (1). The above equation, using measurements from four satellites, may be linearized and expressed in matrix form as follows:

$$\begin{bmatrix} \Delta PR1 \\ \Delta PR2 \\ \Delta PR3 \\ \Delta PR4 \end{bmatrix} = \begin{bmatrix} ux1 & uy1 & uz1 & 1 \\ ux2 & uy2 & uz2 & 1 \\ ux3 & uy3 & uz3 & 1 \\ ux4 & uy4 & uz4 & 1 \end{bmatrix} \times \begin{bmatrix} \Delta x \\ \Delta y \\ \Delta z \\ \Delta cb \end{bmatrix} \text{ or } Z = H \cdot x \quad (2)$$

wherein
- $\Delta PR_i$ is the pseudorange residual for the ith satellite (i=1, 2, 3, 4), and represents a difference between the measured pseudorange and an initial estimated range to the ith satellite (known);
- $ux_i$, $uy_i$, and $uz_i$ are the direction cosines of the line-of-sight (LOS) vector from the receiver to the ith satellite, as projected along the x, y and z coordinate axes (known);
- $\Delta x$, $\Delta y$, $\Delta z$, and $\Delta cb$ are the corrections to the initial estimates of coordinates/position and the clock of the receiver, which may be offset from a reference clock (unknown).

Hereinafter, the pseudorange residual vector is also referred to as Z, the n×4 element matrix H is also referred to as an observation matrix, and x represents the SPS receiver position and time correction vector, which contains the unknowns of interest. Thus, if an inverse of the observation matrix H exists, a unique solution to unknown x in the set of linear equations represented by the above matrix equation (2) may be determined, such that:

$$x = H^{-1} \cdot Z$$

or $$\hat{x} = (H^T \cdot H)^{-1} H^T \cdot Z \quad (3)$$

wherein,
- $H^{-1}$ is the inverse of the observation matrix;
- $(H^T \cdot H)^{-1}$ is the pseudoinverse of the observation matrix; and
- $\hat{x}$ is the least-squares estimate of the vector of unknown parameters, x.

To determine the pseudoranges ($PR_i$), a conventional SPS receiver typically uses an initial estimate of its position and clock bias that is known to within a millisecond. However, since signals from satellites travel at or approximately the speed of light, even a 1 millisecond ambiguity in time may result in an error of up to 300 kilometers in the pseudorange measurement. By solving the matrix equation (2) above, the conventional GPS receiver may compute a correction to its initial clock bias estimate, wherein the initial clock bias estimate is derived by reading the navigational message which provides "time-alignment" information.

Unfortunately, in many situations, determining the system time by reading the navigation message of one or more satellites may be difficult, due signal quality degradation. For example, where there is blockage of the satellite signals, the received signal level or signal-to-noise ratio (SNR) from the GPS satellites may be too low to demodulate and read the satellite data signals without error. Such situations may arise in personal tracking and other highly mobile applications. Under such signal conditions, it is possible for a receiver to still acquire and track the GPS signals. However, performing location and unambiguous time measurement without timing data may be best performed using alternative methods.

The present invention provides a method and apparatus for determining time in an SPS, such as the time of satellite transmission and/or time of measurement by an SPS receiver, relative to a reference time (e.g., system time or other relatively accurate reference time) without the need to determine the reference time from processing timing information provided within the satellite navigational data message.

SUMMARY OF THE INVENTION

A method and apparatus for determining a reference time associated with a satellite positioning system is described. Once determined, the reference time, in one embodiment, may be used to determine other navigational information. Such navigational information may include, for example, the location/position of a satellite positioning system (SPS) receiver. In one embodiment, a relative velocity between an SPS receiver and a set of one or more satellites is used to determine an offset between time as indicated by the SPS receiver and the reference time. According to another embodiment of the invention, an error statistic is used to determine the reference time. According to yet another embodiment of the invention, two records, each representing at least a portion of a satellite message, are compared to determine time. In one implementation, the SPS receiver is mobile and operates in conjunction with a basestation to determine time and/or other navigational information according to one or a combination of the methods described.

DETAILED DESCRIPTION

Various methods and apparatuses for measuring time related to satellite data messages for use with satellite positioning systems are described below. Some of the discussion of the invention focuses upon the United States Global Positioning Satellite (GPS) system. However, it should be evident that these methods are equally applicable to similar satellite positioning systems, such as the Russian Glonass system. Moreover, it will be appreciated that the teachings of the present invention are equally applicable to positioning systems which utilize pseudolites or a combination of satellites and pseudolites. Moreover, the various architectures for basestations and mobile SPS receivers are provided for illustrative purposes rather than to be construed as limitations of the present invention.

OVERVIEW OF ONE EMBODIMENT

UTILIZING SATELLITE VELOCITY FOR TIME DETERMINATION

Figure 1A:
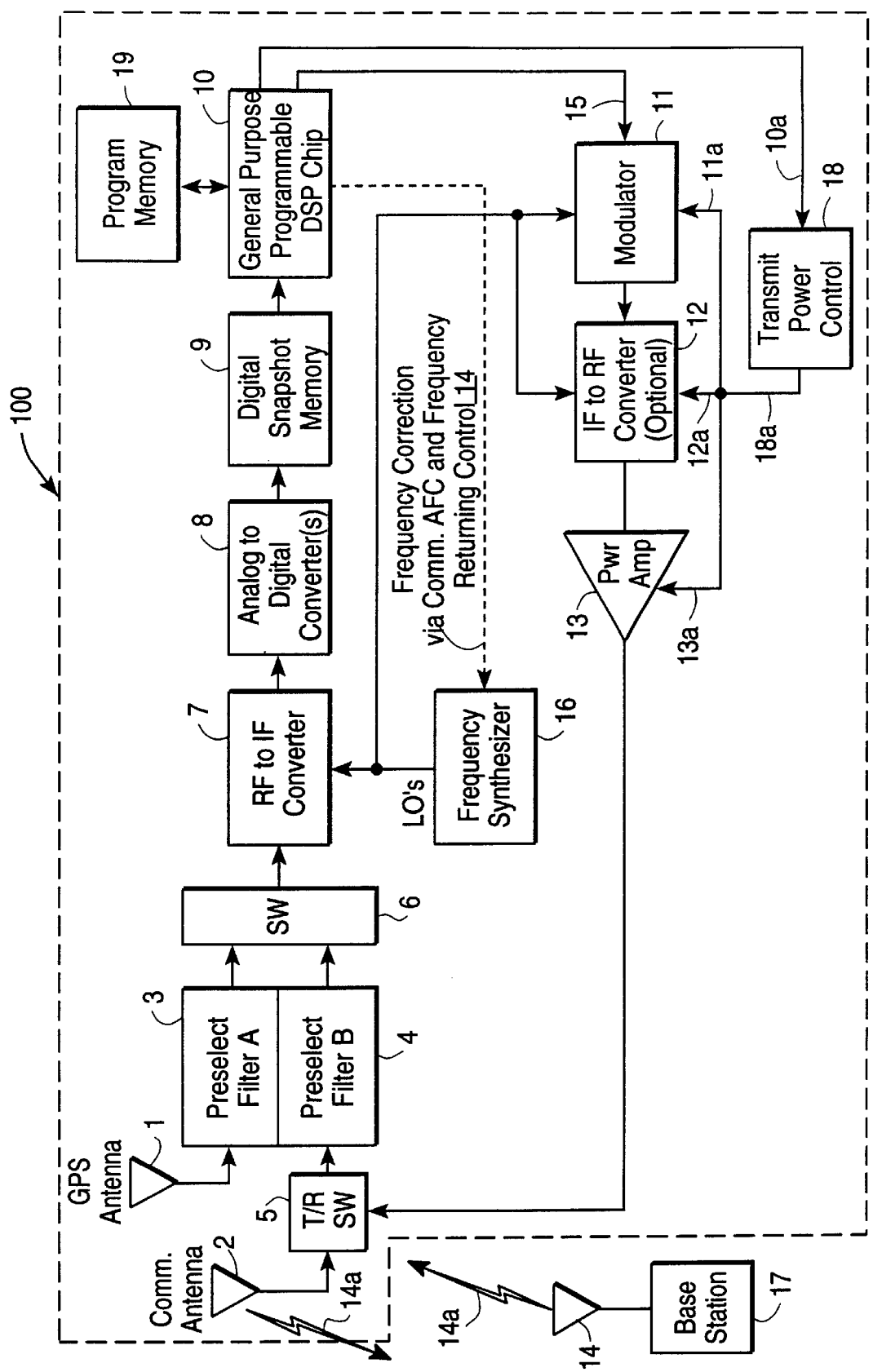
FIG. 1A shows an example of a combined mobile GPS receiver and communication system which may be utilized according to one embodiment of the present invention.
Figure 2:
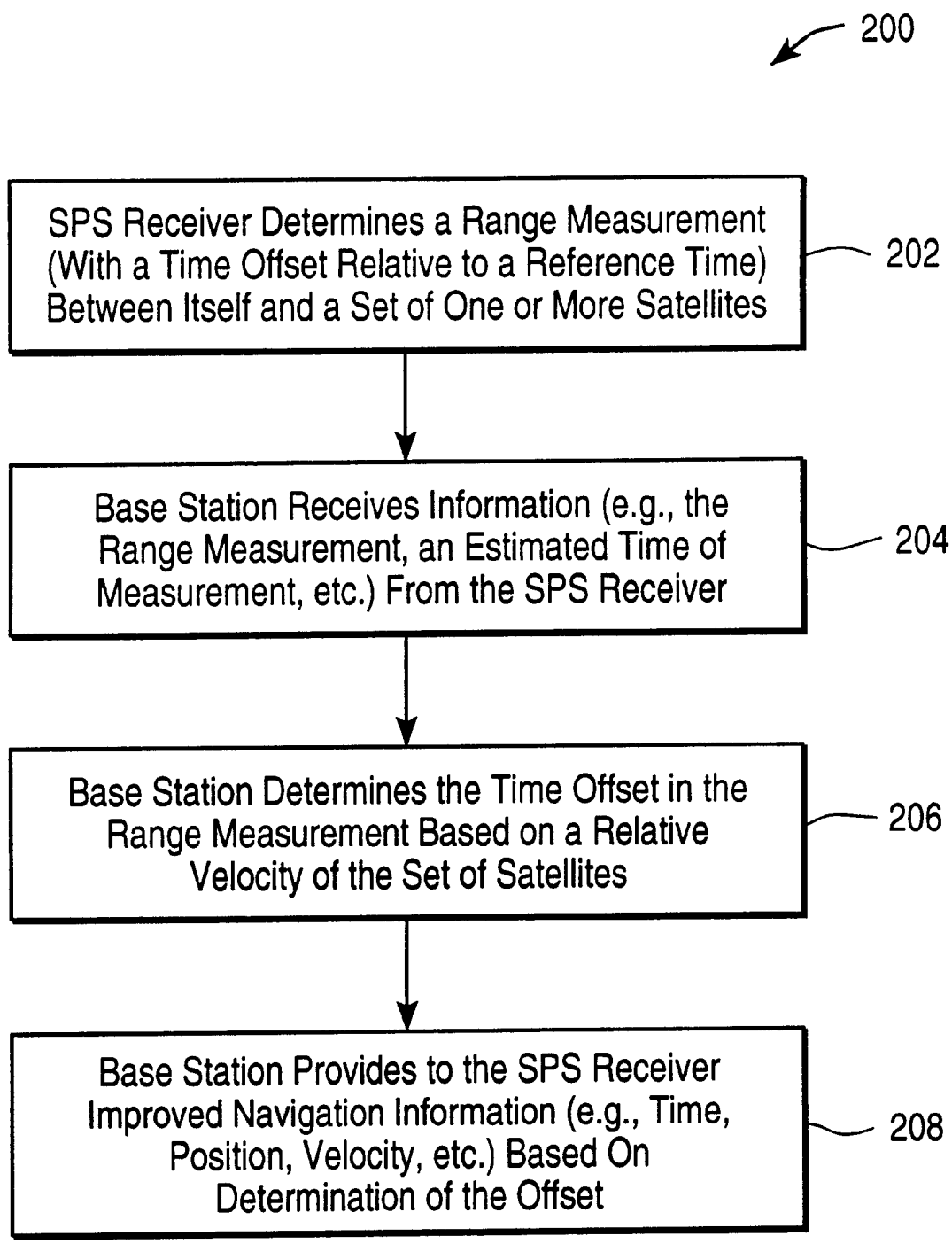
FIG. 2 is a flow diagram illustrating a method for utilizing relative satellite velocity for time determination in a satellite positioning system, according to one embodiment of the invention, as may be utilized with a mobile SPS receiver which is combined with a mobile communication receiver and transmitter, such as that shown in FIG. 1A.

FIG. 2 is a flow diagram illustrating a method for utilizing relative satellite velocity for time determination in a satellite positioning system, according to one embodiment of the invention, as may be utilized with a mobile SPS receiver which is combined with a mobile communication receiver and transmitter, such as that shown in FIG. 1A. In the method 200 shown in FIG. 2, an entity, such as a mobile SPS receiver 100 shown in FIG. 1A, estimates its position to a set of one or more satellites in step 202. In one embodiment, the SPS receiver may determine a set of pseudoranges to the set of satellite based on signals transmitted from the satellites. As such, any range or position estimate by the SPS receiver will typically be offset relative to an actual position or range, due to an offset between the time of measurement as provided by the clock of the SPS receiver, and a reference time.

Figure 7A:
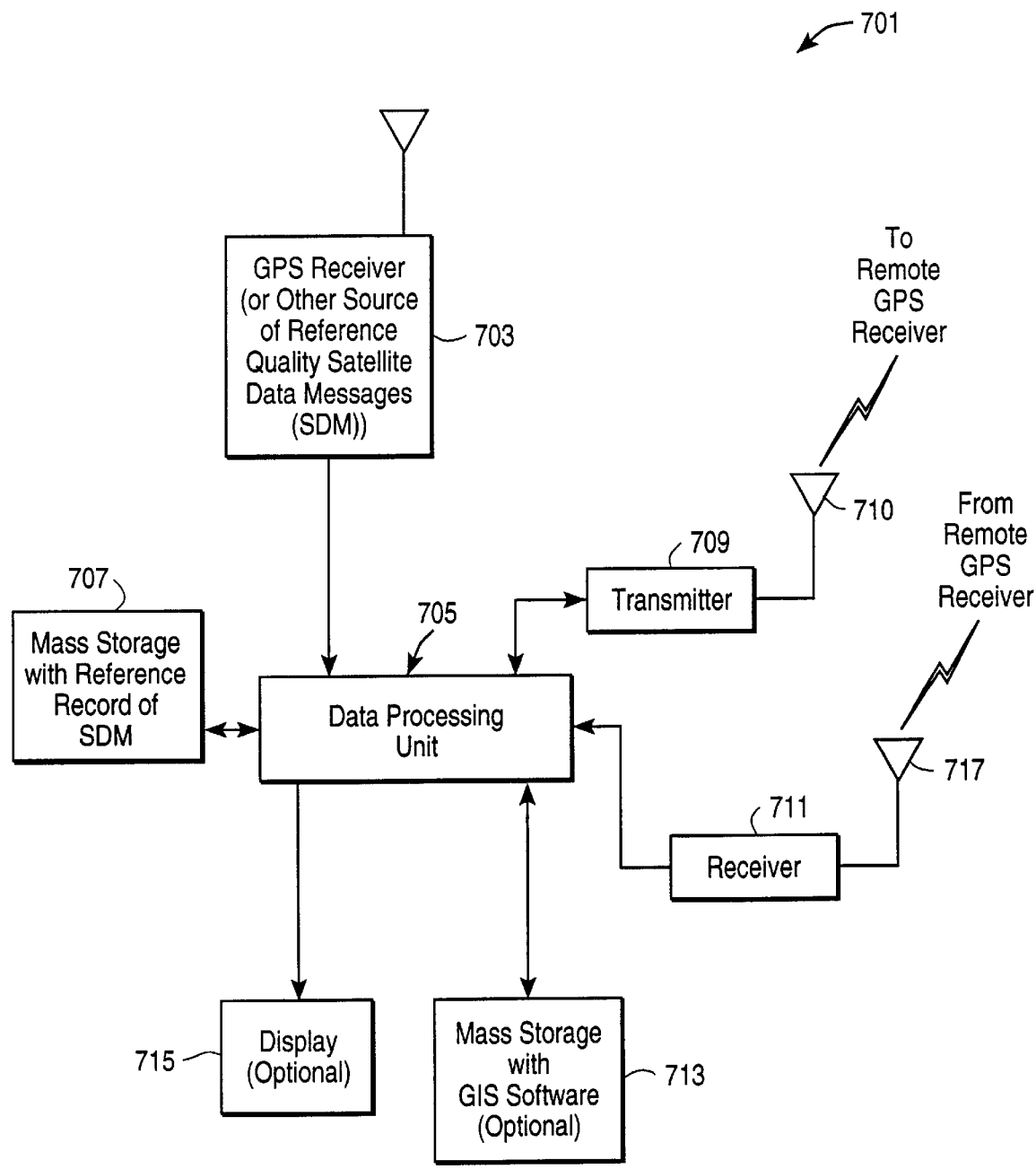
FIG. 7A illustrates a basestation according to one embodiment of the invention.

In step 204, a basestation, such as the basestation shown in FIG. 7A, receives estimation information from the SPS receiver. For example, the estimation information may include a representation of pseudorange measurements, as associated with an estimate of the time of measurement by the SPS receiver. For example, the pseudorange may be determined using the time as indicated by the clock of the SPS receiver. As mentioned above, without knowledge of satellite position at an exact instant of time, relative to an accurate reference time, the SPS receiver may only be limited to an estimate/approximation of its position that may be offset by the actual distance due any offset/error in time.

In step 206, the basestation determines the time offset associated with the range or position estimate of the SPS receiver, as represented by the estimation information provided to the basestation by the SPS receiver, based on an estimate of the relative velocity of the set of satellites. In one embodiment, the relative velocity of each of the set of satellites represents an approximated relative velocity between the satellite and the mobile SPS receiver. A method, according to one embodiment of the invention, for utilizing relative satellite velocity to determine time offset between a time of measurement by an SPS receiver and a reference time (e.g., GPS system time) is described below with reference to matrix equation (4).

Finally, in step 208, the basestation provides improved navigational information, such as time, position, velocity, etc., to the SPS receiver. The improved navigational information is based on a determination of the offset (or an approximation thereof) to determine at what time, relative to the reference time, position, range, or other information was estimated or measured by the mobile SPS receiver. In an alternative embodiment, the basestation may not provide the improved navigation information to the SPS receiver. For example, such information may be stored, provided to another entity via a data communication link which may be wired or wireless, etc.

Table 1 shows how and by which device(s) some of the quantities mentioned herein are determined, according to one embodiment of the invention.

TABLE 1

|  | SPS receiver | Base-station | How Determined |
|---|---|---|---|
| PR | X | X | Measured by method of cross-correlation, for example, as described below with reference to FIGS. 5–6 |
| ΔPR |  | X | Estimated by use of the relationship ΔPR = PR-Ř, wherein Ř is an estimate of the true range R |
| TOM (Time-of-Measurement) |  | X | Estimated, such that TOM(GPS or reference)) = TOM(receiver) + clock offset |
| GPS Time |  | X | Known from reading satellite navigation data message(s) |
| SV Range_rate |  | X | Estimated by reading satellite navigation data message(s) |

In one embodiment of the invention, a pseudorange matrix equation (4) as shown below is solved for the error/offset in time between the estimated time associated with a time of measurement at the mobile SPS receiver and the reference time. Such a solution, in one embodiment, is based upon the relative velocity between the set of satellites used to estimate the position of the mobile SPS receiver and the mobile SPS receiver itself. For five measurements, the modified matrix equation (4) may be expressed as follows:

$$\begin{bmatrix} \Delta PR1 \\ \Delta PR2 \\ \Delta PR3 \\ \Delta PR4 \\ \Delta PR5 \end{bmatrix} = \begin{bmatrix} ux1 & uy1 & uz1 & 1 & sv\_range\_rate1 \\ ux2 & uy2 & uz2 & 1 & sv\_range\_rate2 \\ ux3 & uy3 & uz3 & 1 & sv\_range\_rate3 \\ ux4 & uy4 & uz4 & 1 & sv\_range\_rate4 \\ ux5 & uy5 & uz5 & 1 & sv\_range\_rate5 \end{bmatrix} \times \begin{bmatrix} \Delta x \\ \Delta y \\ \Delta z \\ \Delta t \\ \Delta cb \end{bmatrix} \quad (4)$$

wherein

ΔPRi is the pseudorange residual for the ith satellite (i=1, 2, 3, 4, 5), and represents a difference between the measured pseudorange and an initial estimated range to the ith satellite (known);

uxi, uyi, and uzi are the direction cosines of the line-of-sight (LOS) vector from the receiver to the ith satellite (i=1, 2, 3, 4, 5), as projected along the x, y and z coordinate axes (known);

sv_range_ratei is the relative velocity between the ith satellite (i=1, 2, 3, 4, 5) and an entity (e.g., a mobile SPS receiver) (known);

Δx, Δy, Δz, and Δcb are the corrections to the initial estimates of coordinates/position and the clock of the receiver (unknown);

Δt is the offset in the time measurement, which, in one embodiment, represents the difference (or offset) between the estimated time at which the pseudorange measurements are taken and a reference time (e.g., GPS system time, a time based on GPS system time, etc.) (unknown).

The above matrix equation (4) may be solved to obtain a unique solution to "fit" the pseudorange measurements taken at a particular time. From the solution of the matrix equation (4), Δt provides the coarse correction and Δcb provides the fine correction to the initial estimate of the time at which the pseudoranges are determined. Thus, an offset, which may be in the order of a submillisecond or more, between a reference time (e.g., GPS system time) and the estimated time at which an entity estimates its location and/or that of a set of satellites may be determined based on the relative velocity of the set of satellites.

Although not necessarily always the case, the matrix equation (4) typically includes five unknown values: Δx, Δy, ΔZ, Δcb, and Δt. Thus, unless any of these unknown values are known at the time of measurement, five (or more) independent pseudorange measurements should typically be taken into account to solve for a unique solution for the unknown values.

In general, the accuracy of the matrix equation (4) is dependent at least in part upon the accuracy of the relative velocity of each of the satellites (sv_range_ratei). Furthermore, errors in the initial position and time estimates, which are used to compute the line-of-sight (LOS) vectors from each satellite to an entity, such as a mobile SPS receiver, may cause errors in the velocity estimates of each satellite. Thus, in one embodiment, cellular site location information is utilized to determine an initial estimate of the location of the SPS receive. Furthermore, in one embodiment, the matrix equation (4) is solved iteratively by recomputing the velocities of one or more of the set of satellites with improved position estimates for the entity. As such, each iteration may provide five improvements: three in spatial domain or position/range (Δx, Δy, Δz), and two improvements in the time domain (Δcb and Δt).

In one embodiment of the invention, wherein the velocity of the mobile SPS receiver is known, Doppler measurements may be utilized to determine time. In this embodiment, the a posteriori velocity error is minimized using Doppler information to determine time. The velocity error represents, in this embodiment, the difference between a computed velocity for the mobile SPS receiver (which may be calculated using several methods, including the matrix equation (4) above or the error statistic method described below) and the known velocity of the mobile SPS receiver. By minimizing such as error, the time of interest may be determined. For example, if the mobile SPS receiver is stationary (i.e., velocity is zero), a set of solutions may be computed using several approximations for the time of measurement, relative to a reference time. The solutions corresponding to a velocity of zero would best approximate the reference time, which could then be used to determine the position of the mobile SPS receiver and/or other navigational information. In alternative embodiments of the invention, altitude aiding, dead reckoning (i.e., restricting velocity to a known direction), or other techniques may also be employed to improve or simplify the use of the relative velocity of the SPS receiver and the set of one or more satellites to determine time and/or other navigational information.

OVERVIEW OF ANOTHER EMBODIMENT

UTILIZING AN ERROR STATISTIC FOR TIME DETERMINATION

In one embodiment of the invention, an error statistic is utilized to determine a reference time associated with a satellite positioning system. One situation in which this aspect of the invention—namely, determination of time based on an error statistic—is useful is when the number of measurements (e.g., pseudorange measurements) exceeds the number of unknown values (e.g., $\Delta x$, $\Delta y$, $\Delta z$ $\Delta cb$, etc.). Furthermore, the error statistic may be utilized in conjunction with other techniques for improving determination of time and/or other navigational information.

Figure 3A:
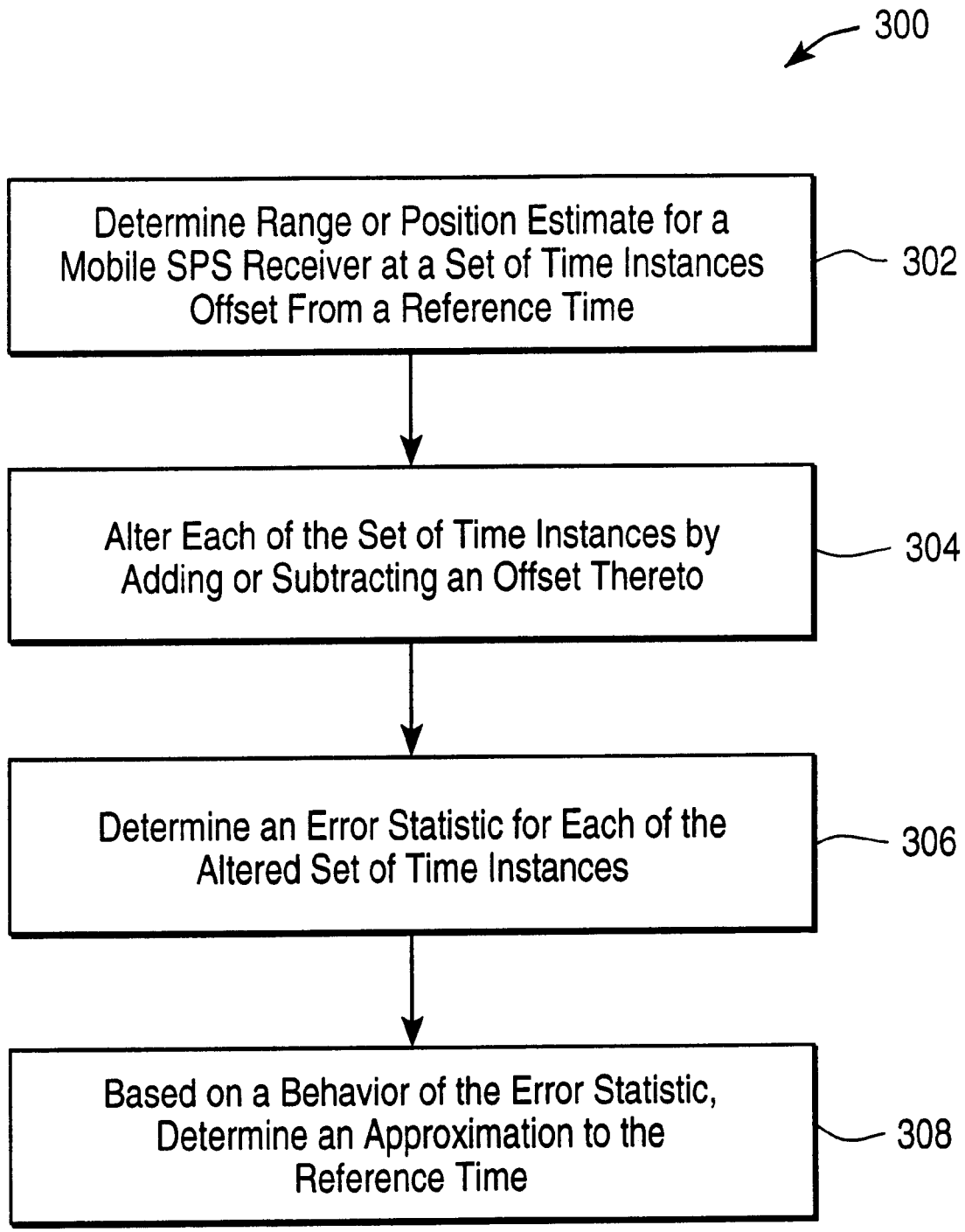
FIG. 3A is a flow diagram illustrating a method for utilizing an error statistic to determine time in a satellite positioning system, according to one embodiment of the invention.

FIG. 3A is a flow diagram illustrating a method for utilizing an error statistic to determine time in a satellite positioning system, according to one embodiment of the invention. In step 302 of the method 300 shown in FIG. 3A, an entity, such as a mobile SPS receiver, estimates its range or position relative to a set of satellites at a set of time instances, wherein one or more of the set of time instances are associated with an estimated time of measurement that is offset from a reference time. Such an offset, as mentioned above, may be due to offset between the SPS receiver clock and time as indicated by a reference clock, drift and/or other inaccuracies in the SPS receiver clock, etc. The reference time may correspond to a time associated with the satellite positioning system, such as GPS system time.

In step 304, each of the set of time instances is altered by further adding or subtracting an offset. For example, in one embodiment, each estimated time of measurement associated with each range or position estimate may be altered by an offset between −5 and +5 seconds. In alternative embodiments, other ranges of offset values may be added or subtracted to obtain various samples for the error statistic.

In step 306, an error statistic is determined for the altered set of time instances (i.e., ones having an offset added thereto or subtracted therefrom). Finally, in step 308, the reference time (or an approximation thereof) is determined based on the behavior of the error statistic. In one embodiment, as further described below with reference to FIG. 3B, the error statistic includes determining a unit variance distribution of pseudorange residual values. In this embodiment, a linear deviation of the unit variance typically corresponds to a linear deviation in the spatial (x, y, z) and temporal ($\Delta t$) domains. By optimizing the error statistic used-which, in the case of unit variance would correspond to a minimum value of the unit variance—a time that approximates the reference time sought could be determined. The use of the unit variance with respect to range or position estimate errors/offsets, according to one embodiment, is further described below with reference to FIG. 3B.

Figure 3B:
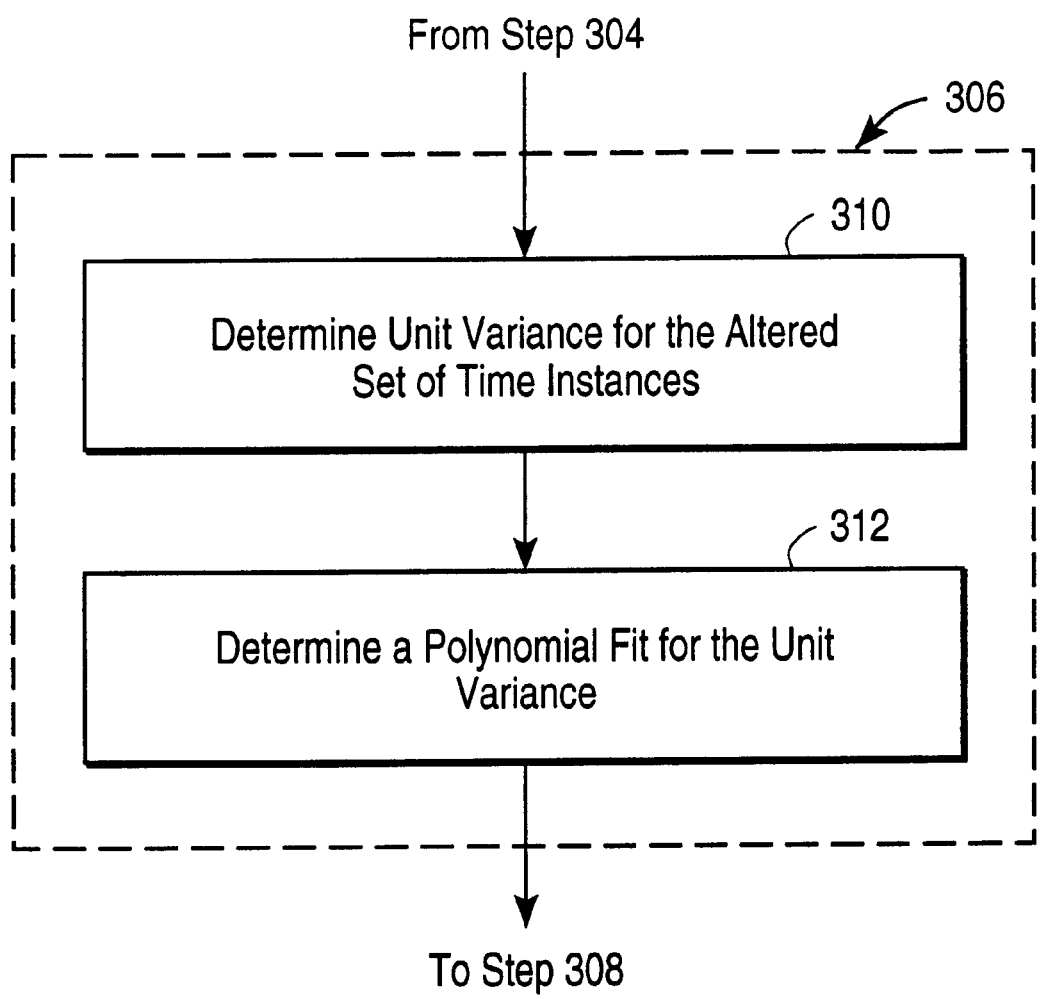
FIG. 3B is a flow diagram illustrating a method for utilizing a unit variance error statistic in the method 300 of FIG. 3A to determine time in a satellite positioning system, according to one embodiment of the invention.

FIG. 3B is a flow diagram illustrating a method for utilizing a unit variance error statistic in the method 300 of FIG. 3A to determine a reference time in a satellite positioning system, according to one embodiment of the invention. In particular, FIG. 3B depicts one embodiment of step 306 of FIG. 3A. In step 310, a unit variance is determined for the altered set of time instances. In one embodiment, the unit variance is defined by:

$$\sigma^2 = \frac{\hat{v}^T W \hat{v}}{n-m}, \hat{v} = H \cdot \hat{x} - Z \text{ (from equation (3) above)} \quad (5)$$

wherein,
$\hat{v}^T$ is the transpose vector of a posteriori pseudorange residuals;
W is a weight factor, which represents a weighting observation matrix.
In one embodiment, no weight factor is used, which is generally equivalent to setting a weight matrix to the identity matrix; and
n is the number of measurements; and
m is a number of unknowns.

Thus, the unit variance represents, in most part, the weighted (or unweighted) sum of squares of the pseudorange residual values. The denominator of the unit variance equation (5) represents the number of degrees of freedom.

In step 312, a polynomial fit for the unit variance is determined. It can be shown that for the normally distributed pseudorange residuals, the expected value of the unit variance is unity and the distribution is the Chi-square distribution with (n-m) degrees of freedom. However, in some cases, individual unit variance values may also equal zero, which corresponds to a perfect fit of a position or time fix for the SPS receiver. Thus, the measurements (e.g., pseudoranges, pseudorange residuals, etc.) for statistically optimum position fix should generally minimize the unit variance, ideally to a value close to zero. In other words, when the unit variance for a set of range or position estimates is minimized, a "best fit" (or solution) may be obtained in space and/or time.

Figure 4A:
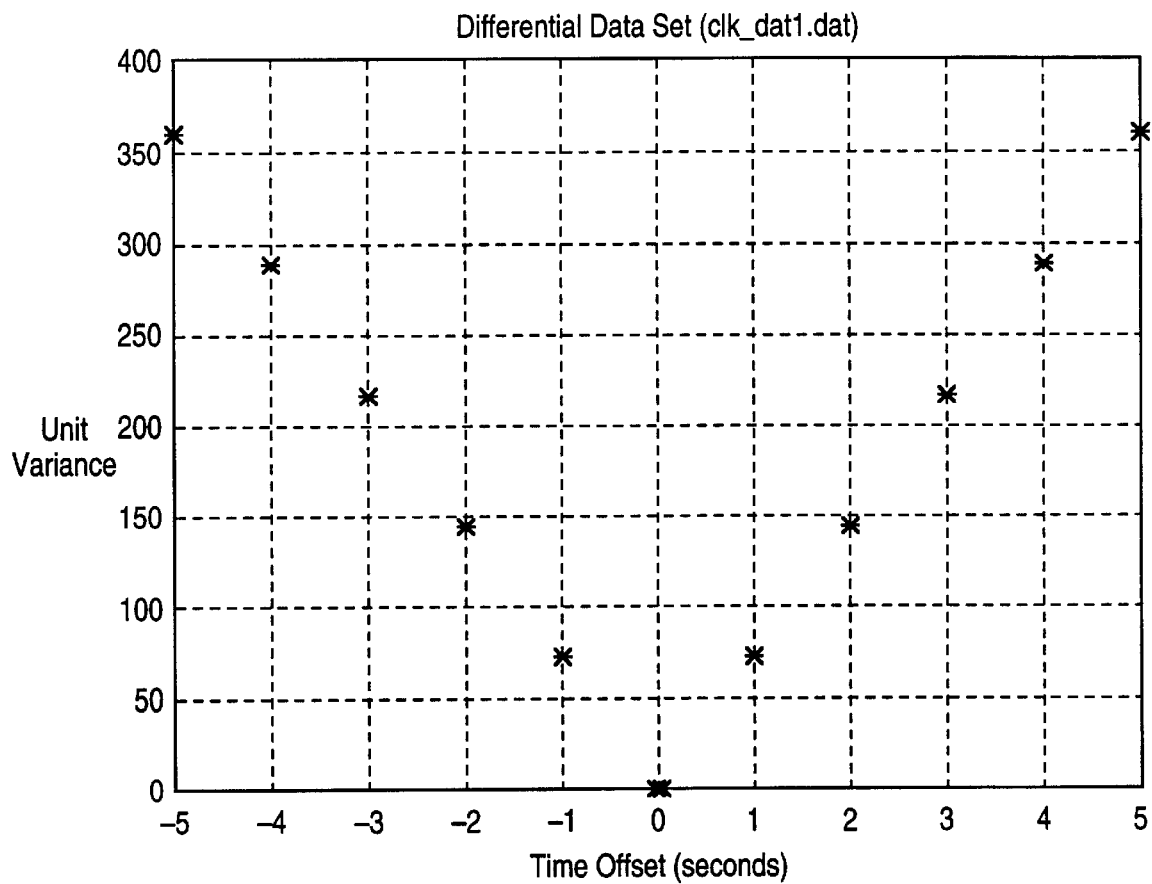
FIGS. 4A and 4B depict an example of unit variance fits for a set of range estimates, according to one embodiment of the invention.
Figure 4B:
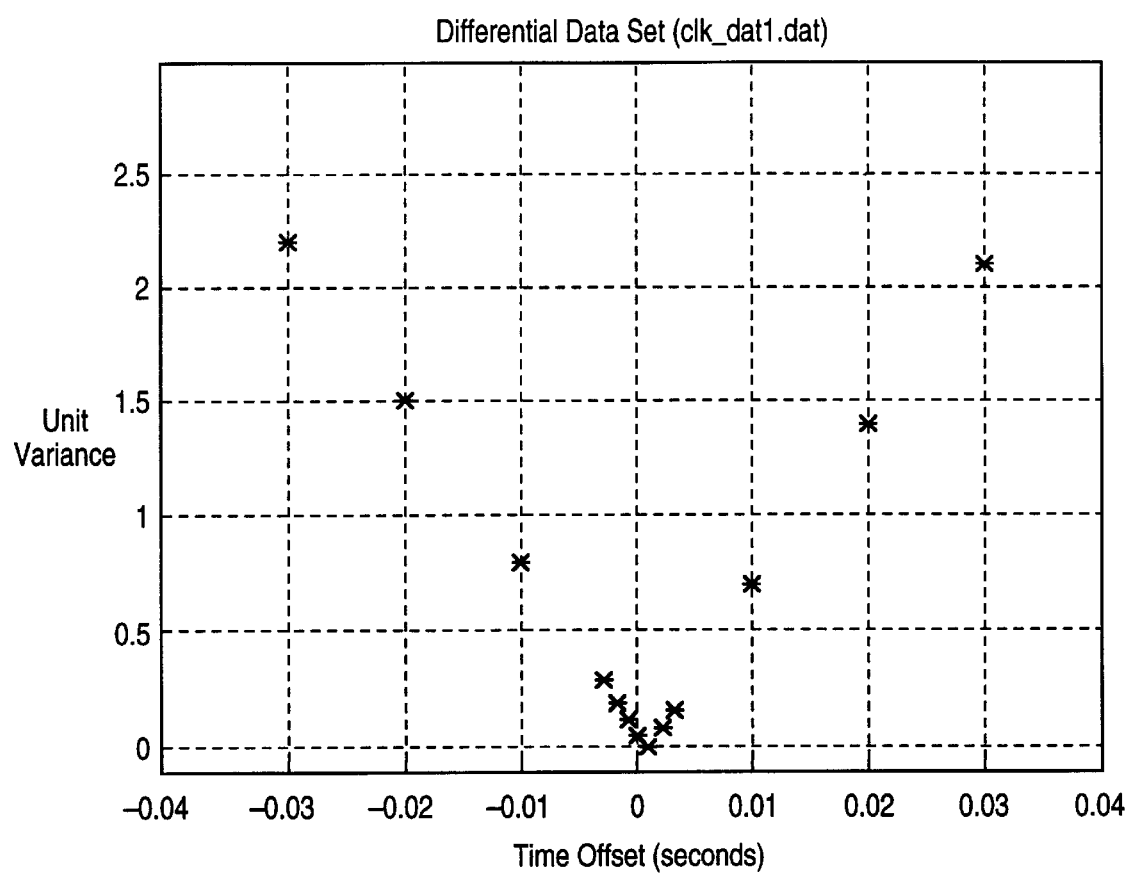

FIGS. 4A and 4B depict an example of unit variance fits for a set of range estimates according to one embodiment of the invention. When a distribution of the unit variance error statistic (as a function of time offset), such as the one shown in FIG. 4A, is obtained, two linear fits may be computed—one for positive offsets and one for negative. The point of inclination, where the two lines intersect, provides an approximation to the reference time. It should be appreciated that several well-known types of polynomial fits may be utilized for the unit variance data, and also, to determine the local minimum of the unit variance distribution, and in turn, the reference time of interest.

FIG. 4B is a zoomed depiction of the unit variance distribution example shown in FIG. 4A. As such, the time offset scale of FIG. 4B is smaller than that of FIG. 4A. It should be noted from the example of FIG. 4B that the intersecting or minimum point of inclination of the unit variance fit may not necessarily correspond exactly to a time offset of zero. In any case, the unit variance may provide a sufficiently accurate estimate of position of an SPS receiver and/or a reference time of interest, such as GPS system time.

It should be appreciated that other error statistics may be used to obtain a "fit" that provides an approximation to a reference time. Furthermore, the method described with reference to FIGS. 3A and 3B may be performed by a combination of a mobile SPS receiver and a basestation, or exclusively by either entity. For example, in one embodiment, the basestation receives a set of range estimates (e.g., pseudorange values) from the mobile SPS receiver, and determines the receiver's time, position, or other navigation information based on an error statistic, such as the unit variance. Optionally, the basestation may provide the navigation information, or information based at least in part thereon, to the mobile SPS receiver or another entity. In this case, the SPS receiver may, based on such information and/or other information, determine its time, position, and/or other navigational information.

AN ALTERNATIVE EMBODIMENT

As indicated above, relative velocity and an error statistic (e.g., unit variance associated with pseudorange residuals) may be used separately or in conjunction, according to various embodiments of the invention, to determine time associated with a satellite positioning system. Furthermore, a selection of which method to use may be made according to a predetermined condition, such as the available data, the quality of signals, the number/spacing of satellites, the range between one or more satellites and the receiver, etc. In one embodiment, both methods may be performed, and the optimum result for the solution of time, position, or other navigational information may be selected based on a minimization of inaccuracy.

In yet another embodiment of the invention, one or a combination of the above-described methods and apparatuses for determining time in a satellite positioning system are combined with another method and apparatus for time determination, as described in detail in U.S. patent application Ser. No. 08/794,649, filed on Feb. 3, 1997, and which is entitled "Method and Apparatus for Satellite Positioning System Based Time Measurement," and which is hereby incorporated herein by reference. As described in detail in the referenced patent, time may be determined by comparing a record of a satellite data message received by an entity, such as a mobile SPS receiver, to another record that is assumed to be error free. From such a comparison, time may be determined as described generally below with reference to FIGS. 5 and 6, and described in further detail in the above-referenced copending application Ser. No. 08/794,649.

Figure 5:
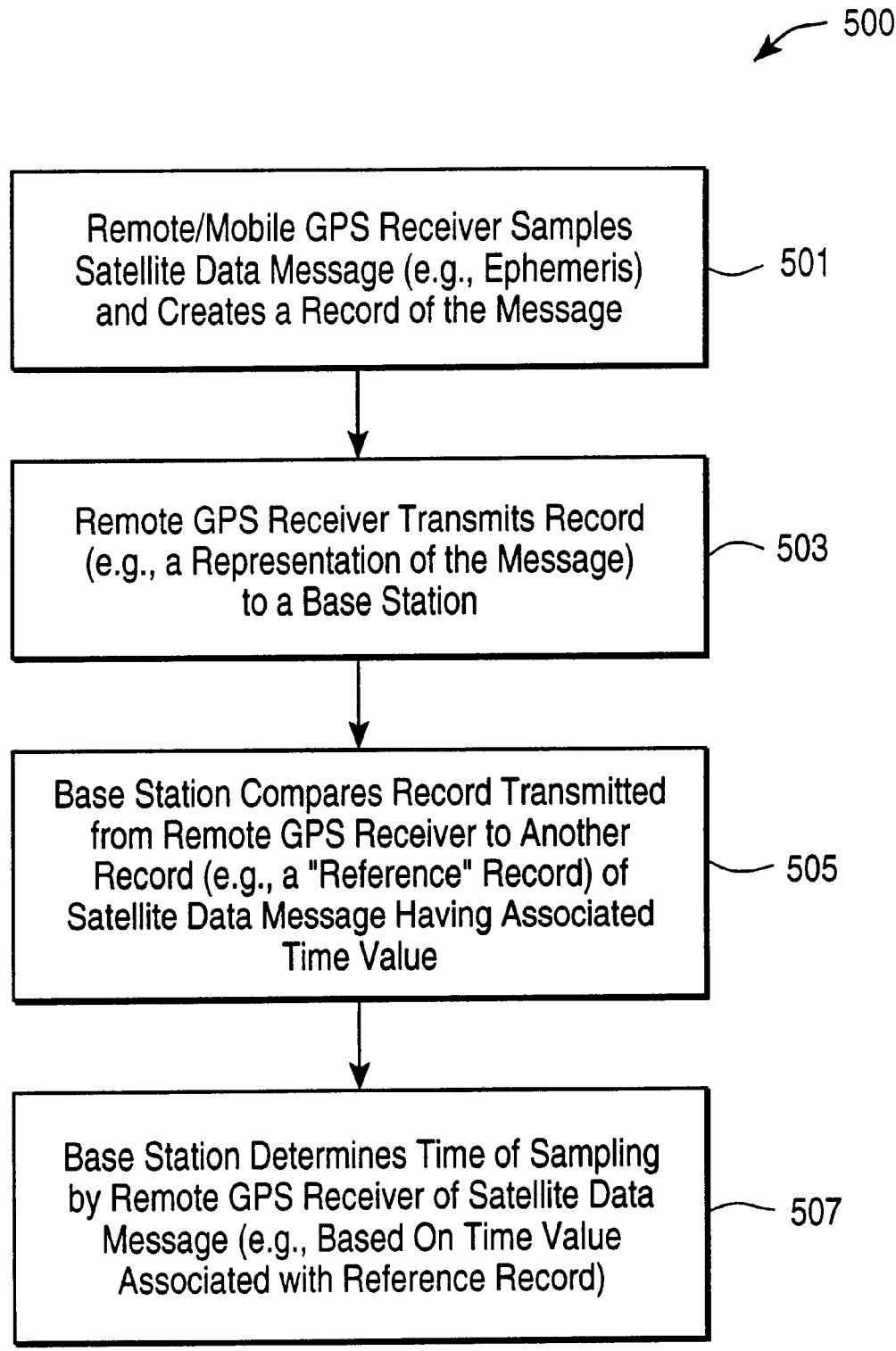
FIG. 5 shows a generalized method for determining time associated with a satellite positioning system based on comparing a first and a second record of a satellite data message, and which may be utilized with a mobile SPS receiver which is combined with a mobile communication receiver and transmitter, such as that shown in FIG. 1A, according to one embodiment of the invention.

FIG. 5 shows a generalized method for determining time associated with a satellite positioning system based on comparing a first and a second record of a satellite data message, and which may be utilized with a mobile SPS receiver which is combined with a mobile communication receiver and transmitter, such as that shown in FIG. 1A, according to one embodiment of the invention. The method described below with reference to FIGS. 5 and 6 may be combined with one or a combination of the above-described techniques of time determination based on relative velocity and/or error statistic determination. The mobile GPS receiver 100 shown in FIG. 1A samples the satellite data message, such as ephemeris, and creates a record of the message in step 501. Next in this method 500, the remote or mobile GPS receiver transmits this record to a basestation, such as the basestation shown in FIG. 7A or 7B in step 503. This record is typically some representation of the satellite data message received by the mobile SPS receiver. In step 505, the basestation compares the record transmitted from the mobile SPS receiver to another record which may be considered a reference record of the satellite navigation message. This reference record has associated time values wherein various segments of the satellite data message have specified "reference" times associated therewith. In step 507, the basestation determines the time of sampling by the mobile GPS receiver of the satellite data message. This determination is based upon a time value which is associated with the reference record, and will generally indicate the time when the record was received by the mobile GPS receiver.

Figure 6:
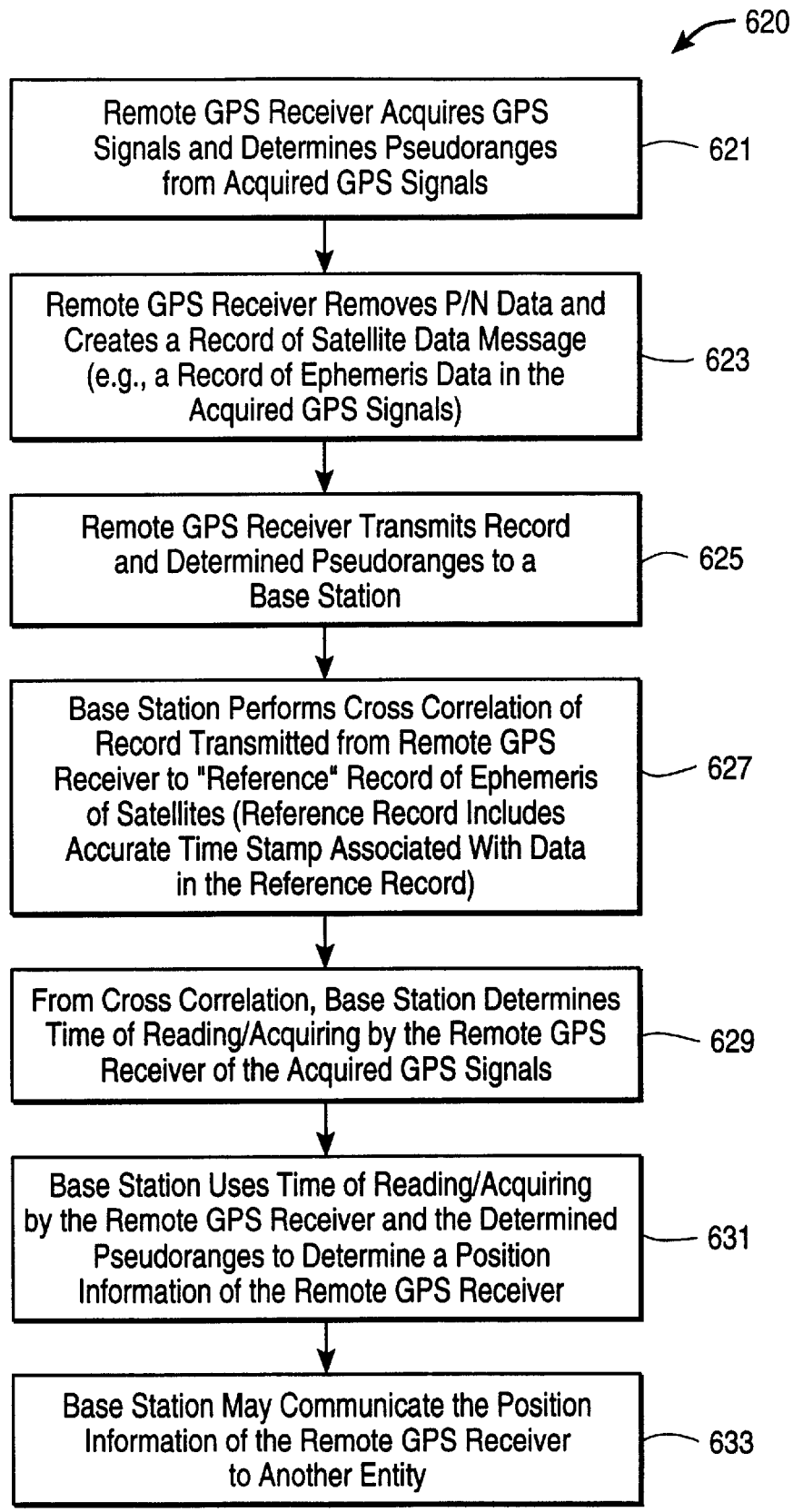
FIG. 6 illustrates in further detail a method 620 for measuring time related to satellite data messages for use with a satellite positioning system.

FIG. 6 illustrates in further detail a method 620 for measuring time related to satellite data messages for use with a satellite positioning system. The mobile or remote GPS receiver acquires in step 621 GPS signals and determines pseudoranges from those acquired GPS signals. In step 623, the mobile GPS receiver removes the PN data and creates a record of the satellite data message from the acquired GPS signals used to create or determine the pseudoranges. This record is typically some representation of the satellite navigation message in the acquired GPS signals and typically represents an estimate of the data. In step 625, the mobile GPS receiver transmits the record and the determined pseudoranges to a basestation, such as the basestation shown in FIG. 7A or 7B.

In step 627, the basestation performs a cross-correlation of the record transmitted from the mobile GPS receiver to a reference record of the navigation message of the set of satellites. This reference record typically includes an accurate time stamp associated with the data in the reference record (e.g. each bit of data in the reference record has an associated time value or "stamp"), and it is this time stamp which will be used to determine the time of receipt by the mobile GPS receiver of the originally acquired GPS signals. Generally, the record transmitted from the mobile GPS receiver and the reference record partially overlap relative to time.

In step 629, the basestation determines from the cross-correlation operation the time of acquiring by the remote GPS receiver of the received GPS signals. The basestation then uses in step 631 the time of the acquiring by the remote GPS receiver of the GPS signals and uses the determined pseudoranges to determine a position information, which may be a latitude and longitude of the remote/mobile GPS receiver. The basestation, in step 633, may communicate this position information of the remote GPS receiver to another entity, such as a computer system coupled through a network, such as the Internet, or an intranet, to the basestation.

HARDWARE OVERVIEW

Figure 1B:
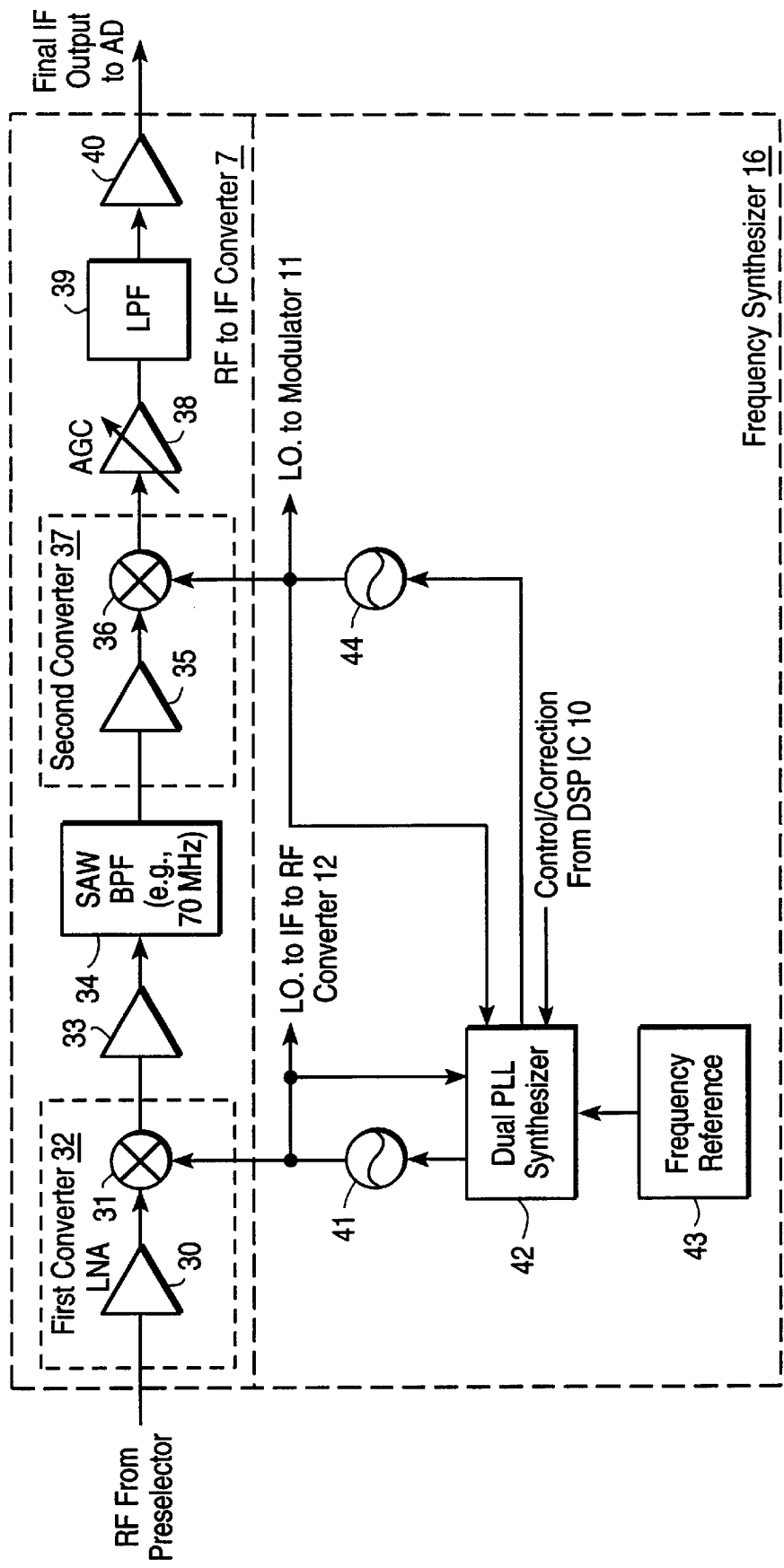
FIG. 1B illustrates in further detail the RF to IF converter 7 and the frequency synthesizer 16 of FIG. 1A.

FIG. 1A shows an example of a combined mobile GPS receiver and communication system which may be used with the present invention. This combined mobile GPS receiver and communication system 100 has been described in detail in copending U.S. patent application Ser. No. 08/652,833, which was filed May 23, 1996, and entitled "Combined GPS Positioning System and Communication System Utilizing Shared Circuitry," which is hereby incorporated herein by reference. FIG. 1B illustrates in further detail the RF to IF converter 7 and the frequency synthesizer 16 of FIG. 1A. These components shown in FIG. 1B are also described in copending application Ser. No. 08/652,833.

The mobile GPS receiver and communication system 100 shown in FIG. 1A may be configured to perform a particular form of digital signal processing on stored GPS signals in such a manner that the receiver has very high sensitivity. This is further described in U.S. Pat. No. 5,663,734, which was issued on Sep. 2, 1997, and is entitled "GPS Receiver and Method for Processing GPS Signals", and this patent is hereby incorporated herein by reference. This processing operation described in U.S. Pat. No. 5,663,734, typically computes a plurality of intermediate convolutions typically using fast Fourier transformations (FFTs) and stores these intermediate convolutions in the digital memory and then uses these intermediate convolutions to provide at least one pseudorange. The combined GPS and communication system 100 shown in FIG. 1A also may incorporate certain frequency stabilization or calibration techniques in order to further improve the sensitivity and accuracy of the GPS receiver. These techniques are described in copending application Ser. No. 08/759,523 which was filed Dec. 4, 1996, and is entitled "An Improved GPS Receiver Utilizing a Communication Link", and which application is hereby incorporated herein by reference.

Rather than describing in detail the operation of the combined mobile GPS receiver and communication system 100 shown in FIG. 1A, a brief summary will be provided here. In a typical embodiment, the mobile GPS receiver and communication system 100 will receive a command from a basestation, such as basestation 17, which may be either one of the basestations shown in either FIG. 7A or FIG. 7B. This command is received on the communication antenna 2 and the command is processed as a digital message and stored in the memory 9 by the processor 10. In one embodiment, the memory 9 could be expanded to be a random access memory (RAM) for storing commands, data, and/or "snapshot" information. The processor 10 determines that the message is a command to provide a position information to the basestation, and this causes the processor 10 to activate the GPS portion of the system at least some of which may be shared with the communication system. This includes, for example, setting the switch 6 such that the RF to IF converter 7 receives GPS signals from GPS antenna 1 rather than communication signals from the communication antenna 2. Then the GPS signals are received, digitized, and stored in the digital memory 9, and may be processed in accordance with the digital signal processing techniques described in the U.S. Pat. No. 5,663,734. The result of this processing typically may include a plurality of pseudoranges for a set of satellites "in view" and these pseudoranges or data based thereon may then be transmitted back to the basestation by the processing component 10 by activating the transmitter portion and transmitting the pseudoranges back to the basestation via the communication antenna 2.

Figure 7B:
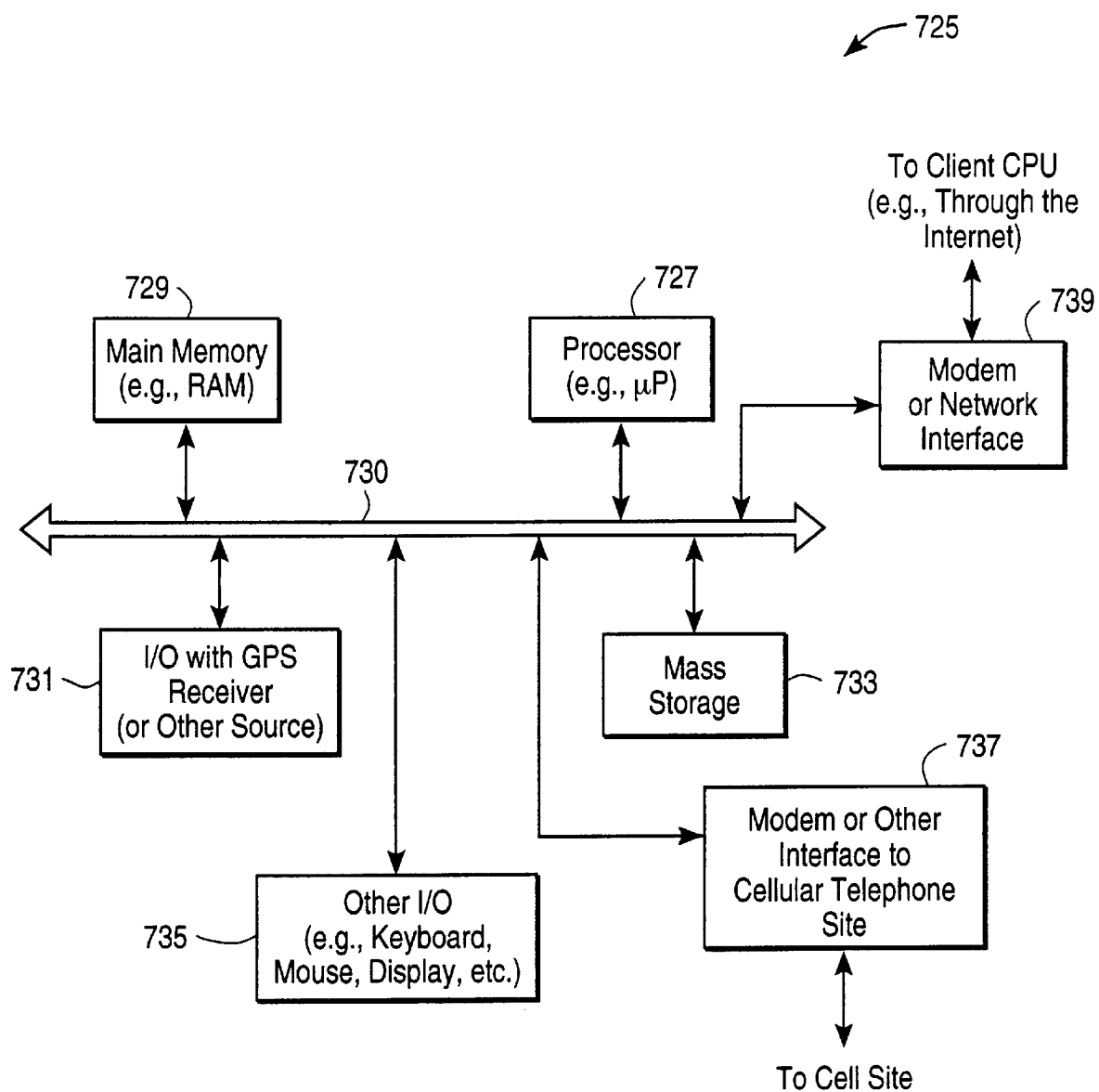
FIG. 7B illustrates a basestation according to one embodiment of the invention.
Figure 8:
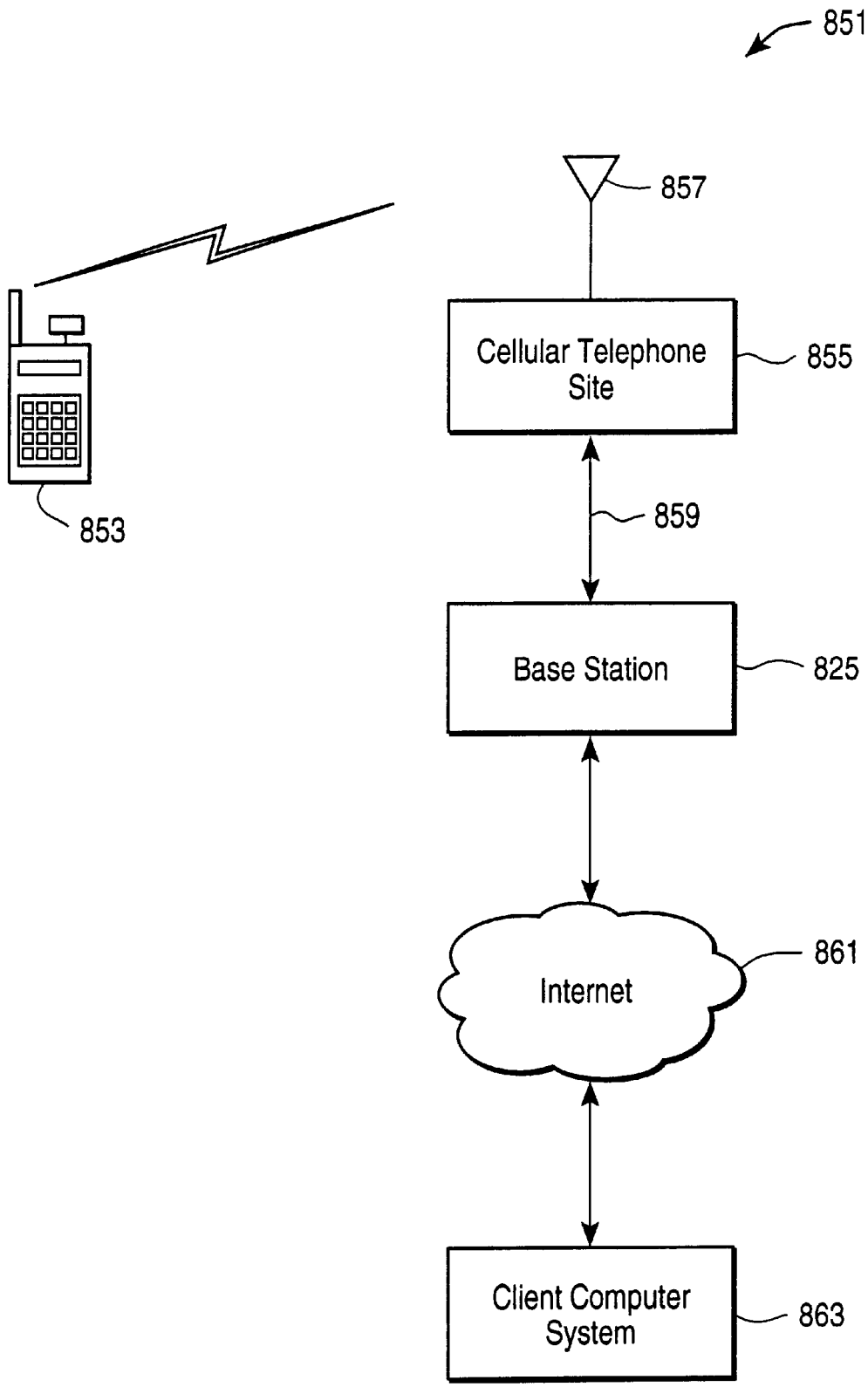
FIG. 8 illustrates a system according to one embodiment of the invention, which includes an SPS receiver, a cellular telephone site, a basestation, the Internet, and a client computer system.

The basestation 17 shown in FIG. 1A may be coupled directly to the remote through a wireless communication link or may be, as shown in FIG. 8, coupled to the remote through a cellular telephone site which provides a wired communication link between the telephone site and the basestation. FIGS. 7A and 7B illustrate examples of these two possible basestations.

The basestation 701 illustrated in FIG. 7A may function as an autonomous unit by providing a wireless link to and from mobile GPS receivers and by processing received pseudoranges. According to one or a combination of the embodiments described above, the basestation 701 may process the pseudoranges to determine time by utilizing relative satellite velocity, an error statistic, and/or a comparison of satellite data message records. The basestation 701 may find use where the basestation is located in a metropolitan area and all mobile GPS receivers to be tracked are similarly located in the same metropolitan area. For example, the basestation 701 may be employed by police forces or rescue services in order to track individuals wearing or using the mobile GPS receivers. Typically, the transmitter and receiver elements 709 and 711, respectively, will be merged into a single transceiver unit and have a single antenna. However, these components have been shown separately as they may also exist separately. The transmitter 709 functions to provide commands and/or navigational information to the mobile GPS receivers through transmitter antenna 710. Typically, the transmitter 709 is under control of the data processing unit 705 which may receive a request from a user of the processing unit to determine the location of a particular mobile GPS receiver. Consequently, the data processing unit 705 would cause the command to be transmitted by the transmitter 709 to the mobile GPS receiver. In response, the mobile GPS receiver would transmit back to the receiver 711 pseudoranges and associated time estimates and/or satellite data message records (or portions thereof) in one embodiment of the present invention to be received by the receiving antenna 712. The receiver 711 receives such information from the mobile GPS receiver and provides them to the data processing unit 705 which then performs one or more of the above-described operations to determine time, position, and/or other navigational information associated with the pseudoranges received from the mobile GPS receiver. As mentioned above with reference to copending application Ser. No. 08/794,649, such operations may involve the satellite data messages received from the GPS receiver 703 or other source of reference quality satellite data messages. This is further described in the above-noted copending patent applications. The GPS receiver 703 may provide the satellite ephemeris data which may be used, in one embodiment, with the pseudoranges and the determined time in order to calculate a position information for the mobile GPS receiver. The mass storage 707 may store satellite velocity information, a stored version of the reference record of the satellite data messages which is used to compare against the records received from the mobile GPS receiver, error statistic analysis routines in accordance with one or more of the techniques discussed above, and/or other information to determine time based on the pseudoranges and any other information provided by the mobile GPS receiver. The data processing unit 705 may be coupled to an optional display 715 and may be also coupled to a mass storage 713 with GIS software which is optional. It will be appreciated that while depicted separately, the mass storage 713 may be the same as the mass storage 707 in that they may be contained in the same hard disk or other data storage device/medium.

FIG. 7B illustrates an alternative basestation of the present invention. This basestation 725 is intended to be coupled to remote transmitting and receiving sites such as a cellular telephone site 855 shown in FIG. 8. This basestation 725 may also be coupled to client systems through a network, such as the Internet or an intranet, or other types of computer networking systems. The use of the basestation in this manner is further described in copending application Ser. No. 08/708,176, which was filed Sep. 6, 1996 and which is entitled "Client-Server Based Remote Locator Device" and which is hereby incorporated herein by reference. The basestation 725 communicates with a mobile GPS unit, such as the combined mobile GPS receiver and communication system 853 shown in FIG. 8 through the cellular telephone site 855 and its corresponding antenna or antennae 857 as shown in FIG. 8. It will be appreciated that the combined GPS receiver and communication system 853 may be similar to the system 100 shown in FIG. 1A.

The basestation 725, as shown in FIG. 7B, includes a processor 727 which may be a conventional microprocessor coupled by a bus 730 to main memory 729 which may be random access memory (RAM). The basestation 725 further includes other input and output devices, such as keyboards, mice, and displays 735 and associated I/O controllers coupled via bus 730 to the processor 727 and to the memory 729. A mass storage device 733, such as a hard disk or CD ROM or other mass storage devices, is coupled to various components of the system, such as processor 727 through the bus 730. An input/output (I/O) device 731 which serves to provide I/O functionality between the GPS receiver or other source of satellite data messages, is also coupled to the bus 730. This I/O device 731 may receive satellite data messages from a GPS receiver (e.g., the GPS receiver 703 shown in FIG. 7A) and provides them through the bus 730 to the processor which, in accordance to one of the above described embodiments of the invention, may cause a time stamp to be applied to them. The records may then be stored in the mass storage device 733, for example, for later use in comparing to records received from mobile GPS receivers. The mass storage device 733 may also store velocity information representing relative velocity of a set of one or more satellites. Additionally, the mass storage device 733 may store routines corresponding to one or more of the above-described methods for processing satellite positioning information/signals.

Two modems 739 and 737 are shown in FIG. 7B as interfaces to other systems remotely located relative to the basestation 725. In the case of modem or network interface 739, this device is coupled to a client computer, for example, through the Internet or some other computer network. The modem or other interface 737 provides an interface to the cellular telephone site, such as the site 855 shown in FIG. 8 which illustrates a system 851.

The basestation 725 may be implemented with various computer architectures as will be appreciated by those skilled in the art. For example, there may be multiple busses or a main bus and a peripheral bus or there may be multiple computer systems and/or multiple processors. It may be advantageous, for example, to have a dedicated processor to receive the satellite data message from the GPS receiver 703 and process that message in order to provide a reference record in a dedicated manner such that there will be no interruption in the process of preparing the reference record and storing it and managing the amount of stored data in accordance with one of the above-described embodiments of the present invention.

FIG. 8 illustrates a system according to one embodiment of the invention, which includes an SPS receiver, a cellular telephone site, a basestation, the Internet, and a client computer system. The system 851 shown in FIG. 8 may operate, in one embodiment, in the following manner. A client computer system 863 will transmit a message through a network, such as the Internet 861 to the basestation 825. It should be appreciated that there may be intervening routers or computer systems in the network or Internet 861 which pass along the request for position of a particular mobile GPS receiver. The basestation 825 will then transmit a message through a link, which is typically a wired telephone link 859, to the cellular telephone site 855. This cellular telephone site 855 then transmits a command using its antenna or antennae 857 to the combined mobile SPS receiver and communication system 853. In response, the system 853 transmits back pseudoranges, records of the satellite data messages, velocity information, and/or other information. Such information may be received by the cellular telephone site 855 and communicated back to the basestation through link 859. The basestation then performs one or more of the operations as described above with various embodiments of the invention, such as time determination using one or a combination of relative satellite velocity, Doppler measurements, an error statistic, and/or comparing two or more satellite data records. The basestation may then determine navigational information, such as time and/or position of the SPS receiver, and communicate the navigational information through a network, such as the Internet 861, to the client computer system 853 which may itself have mapping software at the client computer system, allowing the user of this system to see on a map the exact position of the mobile SPS system 853.

ALTERNATIVE EMBODIMENTS

While the invention has been described in terms of several embodiments and illustrative figures, those skilled in the art will recognize that the invention is not limited to the embodiments or figures described. In particular, the invention can be practiced in several alternative embodiments that provide a method and/or apparatus to determine time or other navigational information in satellite positioning system by one or a combination of the following: (1) utilizing relative velocity of an entity and/or a set of satellites; (2) computing an error statistic for time or position/range; and (3) comparison of two or more satellite data messages.

Therefore, it should be understood that the method and apparatus of the invention can be practiced with modification and alteration within the spirit and scope of the appended claims. The description is thus to be regarded as illustrative instead of limiting on the invention.

What is claimed is:

1. A method for determining time associated with a satellite positioning system, said method comprising:

storing a value to indicate a velocity of at least one satellite of the satellite positioning system; and determining said time based on said value.

2. The method of claim 1, wherein the determining of said time comprises:

computing a first range value between an entity and said at least one satellite, said first range value associated with a first time error; and determining an offset based on said value and said first range value, said offset indicating said first time error.

3. The method of claim 2, further comprising:

determining a position of said entity based on said first range value and said first time error.

4. The method of claim 3, wherein said entity comprises a mobile satellite positioning system (SPS) receiver.

5. The method of claim 3, wherein said determining of said position of said entity based on said first range value and said first time error is performed by a remote entity.

6. The method of claim 5, further comprising said remote entity providing navigational information to said entity, wherein said navigational information comprises information related to said position of said entity.

7. An apparatus for determining time associated with a satellite positioning system, said apparatus comprising:

a storage unit for storing a value to indicate a velocity of at least one satellite of the satellite positioning system; and a processor coupled to the storage unit, said processor determining said time based on said value.

8. The apparatus of claim 7, wherein said processor determines said time by:

computing a first range value between an entity and said at least one satellite, said first range value associated with a first time error; and determining an offset based on said value and said first range value, said offset indicating said first time error.

9. The apparatus of claim 8, wherein the processor determines a position of said entity based on said first range value and said first time error.

10. The apparatus of claim 9, wherein said entity comprises a mobile satellite positioning system (SPS) receiver and wherein said time is an SPS time.

11. The apparatus of claim 9, wherein said apparatus comprises said SPS receiver.

12. A machine readable medium containing executable instructions which when executed by a processing system cause the processing system to perform a method for determining time associated with a satellite positioning system, said method comprising:

storing a value to indicate a velocity of at least one satellite of the satellite positioning system; and determining said time based on said value.

13. The machine readable medium of claim 12, wherein the determining said time comprises:

computing a first range value between an entity and said at least one satellite, said first range value associated with a first time error; and determining an offset based on said value and said first range value, said offset indicating said first time error.

14. The machine readable medium of claim 13, the method further comprising determining a position of said entity based on said first range value and said first time error.

15. The machine readable medium of claim 14, wherein said entity comprises a mobile satellite positioning system (SPS) receiver and wherein said time is an SPS time.

16. The machine readable medium of claim 14, wherein determining said position of said entity based on said first range value and said first time error is performed by a remote entity.

17. The machine readable medium of claim 16, the method further comprising said remote entity providing navigational information to said entity, wherein said navigational information comprises information related to said position of said entity.

* * * * *